Nov. 3, 1925.

R. C. BEERY ET AL

EDUCATIONAL DEVICE

Filed March 14, 1924

Inventors
RAY C. BEERY,
ROBERT CRAIG,
By Toulmin Toulmin
Attorneys

Nov. 3, 1925.

R. C. BEERY ET AL 1,559,665

EDUCATIONAL DEVICE

Filed March 14, 1924  2 Sheets-Sheet 2

Inventors
RAY C. BEERY,
ROBERT CRAIG,
By Toulmin & Toulmin,
Attorneys

Patented Nov. 3, 1925.

1,559,665

UNITED STATES PATENT OFFICE.

RAY C. BEERY, OF PLEASANT HILL, AND ROBERT CRAIG, OF DAYTON, OHIO; SAID CRAIG ASSIGNOR TO SAID BEERY.

EDUCATIONAL DEVICE.

Application filed March 14, 1924. Serial No. 699,174.

*To all whom it may concern:*

Be it known that we, RAY C. BEERY and ROBERT CRAIG, citizens of the United States, residing at Pleasant Hill, Miami County, Ohio, and Dayton, Montgomery County, Ohio, respectively, have invented certain new and useful Improvements in an Educational Device, of which the following is a specification, reference being had therein to the accompanying drawing.

Our invention relates to an educational device for use by children.

It is the object of our invention to provide in a single compact unit means for instructing children in the copying of various designs. It is our object to permit of this copying, either on a medium which may be permanently retained, or upon a medium which may be detached.

It is an additional object of our invention to provide means of moving a new design to be copied in such a manner that a child may move the mechanism for presenting the new design.

It is a further object of our invention to provide means of installing readily and quickly new strips bearing a new series of designs or drawings.

It is an additional object of our invention to provide within the same self-contained cabinet a drawer for holding the drawing materials and other articles.

It is our object to provide within the same cabinet a space for the playing of games.

It is an additional object of our invention to provide either tracing by the contact method or by illumination. It is our object to provide means of projecting light of artificial character through the movable strip, which has upon it the designs, thus enabling tracing to be done through the heavier materials.

It is well known that copying of pictures, designs and other items of pictorial information is a preferred method of instructing persons of a variety of ages. It is the object of our invention to facilitate such instruction.

It is a further object to provide a readily detachable holder for the tracing glass or tracing paper, upon which the designs are traced.

Referring to the drawings.

Figure 1:
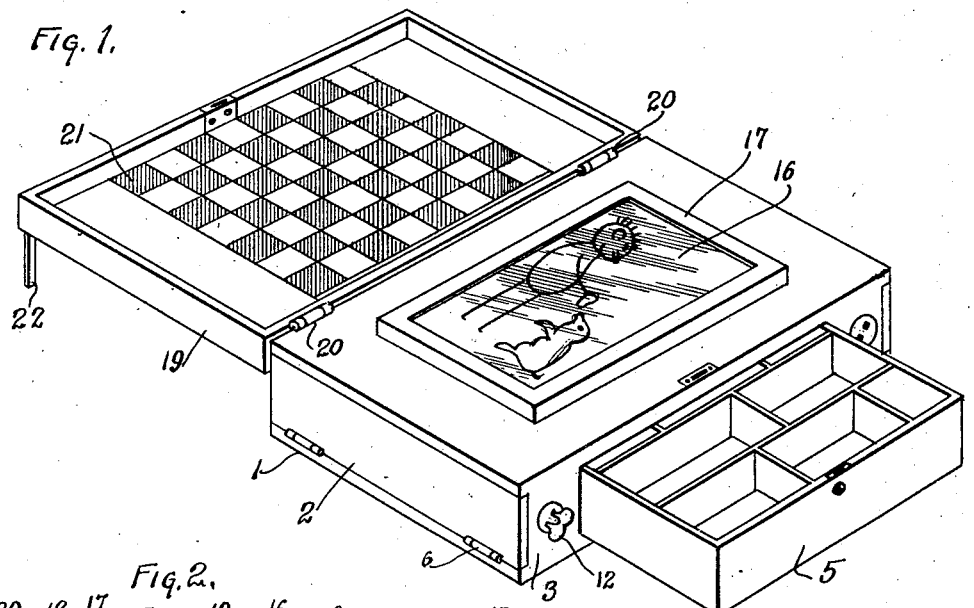
Figure 1 is a perspective of the cabinet with the top open and the drawer out.
Figure 2:
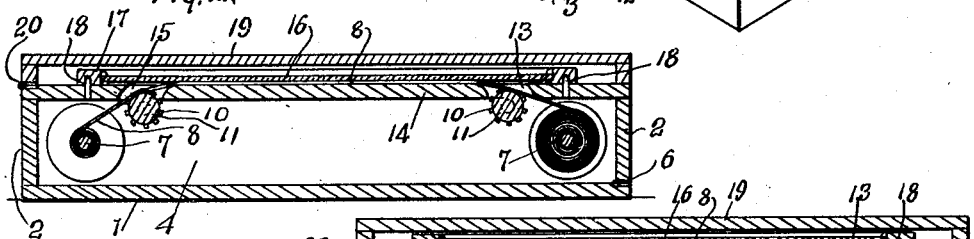
Figure 2 is a section on the line 2—2 of Figure 1, showing the form of cabinet in which the contact method is used.

Turning to the details of the drawings:

1 is the bottom of a box having the end walls 2, the front wall 3, and the rear wall 4. In the front wall is inserted a drawer 5. The side walls are hinged as at 6 to permit the insertion of the rolls 7, which carry the strip of illustrations. These strips are designated 8 and are provided with a plurality of rectangular perforations along the margin, such perforations being designated 9. In these perforations fit the teeth 10 of the guide rollers 11. The purpose of such guide rollers is to prevent warping or twisting of the paper sheet and to insure its even winding on the rolls 7. These rolls 7 are actuated by the key 12, which is detachable so that one key can be used in the end of either roll.

The strip 8 passes through the opening 13, over a supporting surface 14, downwardly through the opening 15 over its guide roll and on to the other roller. Just above this surface 14 is a ground glass 16, or a glass otherwise treated so that it may be written upon and the writing erased at the will of the user. In the place of this glass, tracing paper or cards may be inserted. The glass is carried by a frame 17, which is located in position by the dowel pins 18. The box is provided with a hinged cover 19, hinged to the box at 20, which serves to cover the glass when in closed position and when in open position the inside of the top forms a platform for playing various games. For instance, a checker board 21 is illustrated. The top 19 carries a folding leg 22 to support its outer end when desired. It will be obvious that this top may be hinged either on the back or the sides of the box. It will be equally obvious that the rolls may be installed as indicated fore and aft of the box or transversely of the box. If the latter is the case, the drawer may be put on the side of the box.

The close engagement of the drawing glass 16 with the strip supported by the surface 14 insures a clear vision of the figures on the strip and makes it an easy matter to trace such figures.

Figure 3:
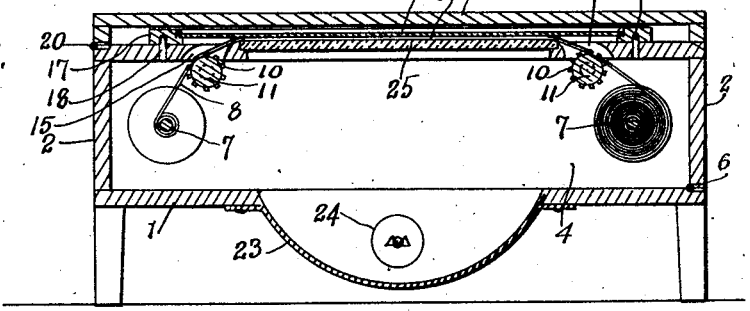
Figure 3 is a similar view showing one form of the artificial illumination.

In the form shown in Figure 3 the bottom of the box is provided with a cup-shaped housing 23, in which is located an electric lamp 24. This housing serves as a reflector for reflecting the light through a glass writing surface 25.

Figure 4:
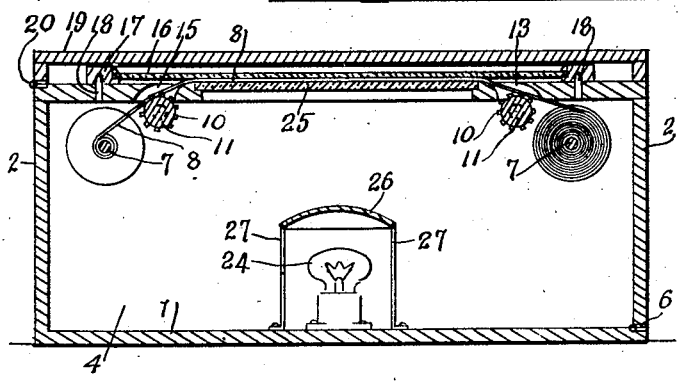
Figure 4 is a view similar to Figure 3, showing a form of indirect artificial illumination.

In the form shown in Figure 4 for indirect illumination the lamp 24 is mounted on the bottom 1. A reflector 26 is mounted above it on spaced legs 27, so that the light is reflected down on the inside of the bottom 1 and the side walls 2. These surfaces are coated with an aluminum paint so that the light is reflected upwardly through the glass 25, the paper strip 8 and through the writing glass 16.

The method of holding the rolls 7 may be any form of detachable spring holder or any other form of mechanical holder, as this does not form a part of our invention.

Figure 5:
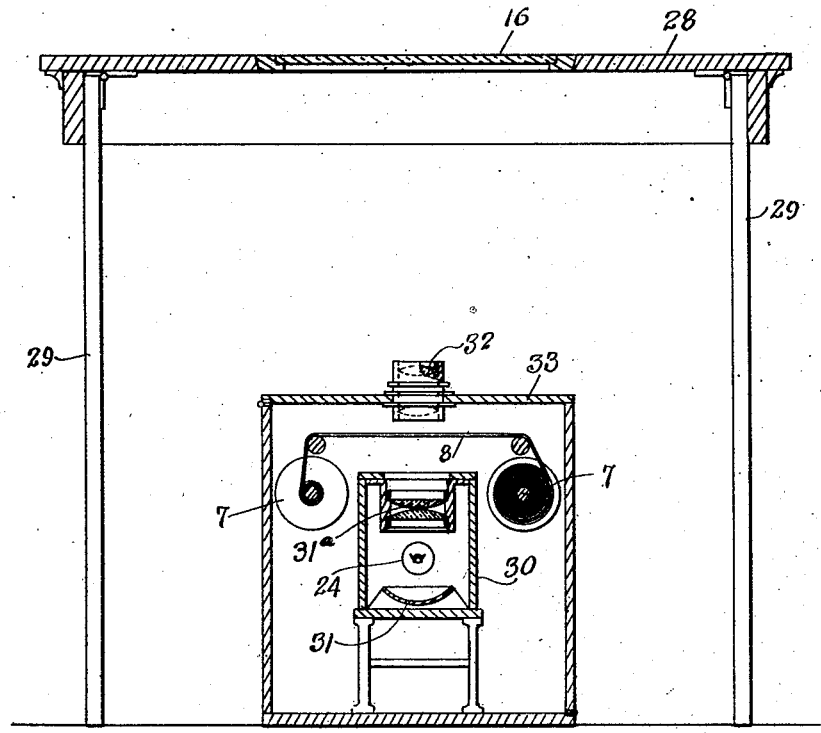
Figure 5 is a section showing a modified form, in which there is a portable projection cabinet and a tracing screen carried upon a collapsible table.
Figure 6:
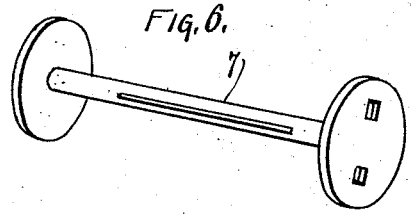
Figure 6 is a side elevation of one of the rolls carrying the illustrated strip, showing the method of mounting the roll.
Figure 7:
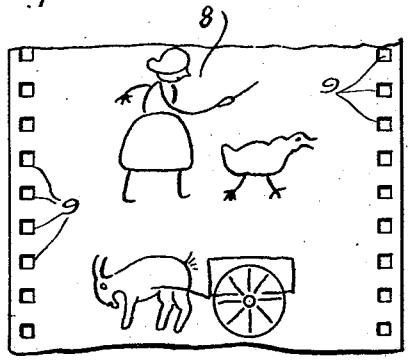
Figure 7 is a plan view of a portion of the strip, showing the positioning apertures.

Turning to the form shown in Figure 5, it will be noted that a table 28 is provided, having the folding legs 29. This table carries a glass 16, upon which the image or design on the strip 8 is projected.

This projection is perfected in the following manner. Within a lamp box 30 is a lamp 24, having a reflector 31 which concentrates the reflected rays at the center of the lamp. These rays are converged by the condenser 31ª, pass through the strip 8 and projected by the system of the projecting lenses 32 and carried by the projection box top 33. The projection box itself carries in its side walls the rolls 7, on which is wound the strip 8.

We desire to comprehend within our invention such modifications as may be necessary to adapt it to varying conditions.

Having thus fully described our invention, what we claim as new and desire to secure by Letters Patent, is:

An educational device comprising a permanent transparent writing surface and a strip containing a series of illustrations adapted to be successively presented immediately beneath said surface and in contact therewith, whereby the several illustrations may be traced on said writing surface as desired.

In testimony whereof, we affix our signatures.

RAY C. BEERY.
ROBERT CRAIG.